United States Patent
Kim

(10) Patent No.: US 10,533,504 B2
(45) Date of Patent: Jan. 14, 2020

(54) METHOD AND APPARATUS FOR CONTROLLING ENGINE SYSTEM

(71) Applicants: Hyundai Motor Company, Seoul (KR); Kia Motors Corporation, Seoul (KR)

(72) Inventor: Seungbum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 258 days.

(21) Appl. No.: 15/835,094

(22) Filed: Dec. 7, 2017

(65) Prior Publication Data

US 2018/0163644 A1 Jun. 14, 2018

(30) Foreign Application Priority Data

Dec. 13, 2016 (KR) .................. 10-2016-0169863

(51) Int. Cl.
| | |
|---|---|
| *F01L 1/34* | (2006.01) |
| *F02D 13/02* | (2006.01) |
| *F02D 35/02* | (2006.01) |
| *F02P 5/152* | (2006.01) |
| *F02D 41/14* | (2006.01) |
| *F02D 41/10* | (2006.01) |
| *F02D 37/02* | (2006.01) |
| *F02D 41/00* | (2006.01) |

(52) U.S. Cl.
CPC ..... *F02D 13/0215* (2013.01); *F02D 13/0261* (2013.01); *F02D 35/027* (2013.01); *F02D 41/10* (2013.01); *F02D 41/1475* (2013.01); *F02P 5/152* (2013.01); *F02D 37/02* (2013.01); *F02D 41/0007* (2013.01); *F02D 2041/001* (2013.01); *F02D 2200/101* (2013.01); *F02D 2200/602* (2013.01); *Y02T 10/18* (2013.01); *Y02T 10/46* (2013.01)

(58) Field of Classification Search
CPC .. F02D 41/1475; F02D 41/10; F02D 41/0007; F02D 41/001; F02D 35/027; F02D 13/0215; F02D 13/0261; F02D 37/02; F02D 2200/602; F02D 2200/101; Y02T 10/18; Y02T 10/46
See application file for complete search history.

(56) References Cited

U.S. PATENT DOCUMENTS

2014/0026872 A1\* 1/2014 Kerns ................. F02D 41/0065
123/568.11

FOREIGN PATENT DOCUMENTS

KR 10-1655228 B1 9/2016

\* cited by examiner

*Primary Examiner* — Zelalem Eshete
(74) *Attorney, Agent, or Firm* — Morgan, Lewis & Bockius LLP

(57) ABSTRACT

A method of controlling an engine system may include: method of controlling an engine system including a continuous variable valve duration (CVVD) apparatus, the method including: detecting data for controlling the engine system; determining whether a speed of an engine is less than a predetermined speed; determining whether a position value of an accelerator pedal is greater than a predetermined position value when the rotation speed of the engine is less than the predetermined speed; operating the CVVD apparatus to increase a valve overlap when the position value of the accelerator pedal is greater than the predetermined position value; and performing a knock control after the valve overlap is increased.

14 Claims, 4 Drawing Sheets

METHOD AND APPARATUS FOR CONTROLLING ENGINE SYSTEM

CROSS-REFERENCE TO RELATED APPLICATION

The present application claims priority to Korean Patent Application No. 10-2016-0169863 filed on Dec. 13, 2016, the entire contents of which is incorporated herein for all purposes by this reference.

BACKGROUND OF THE INVENTION

Field of the Invention

The present invention relates to a method of and an apparatus for controlling an engine system. More particularly, the present invention relates to a method of and an apparatus for controlling an engine system including a continuous variable valve duration (CVVD) apparatus.

Description of Related Art

An internal combustion engine generates power by combusting fuel in a combustion chamber in an air media drawn into the chamber. Intake valves are operated by a camshaft to intake the air, and the air is drawn into the combustion chamber while the intake valves are open. Furthermore, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. To achieve such optimal valve operation depending on the rotation speed of the engine, various researches including designing of a plurality of cams and a continuous variable valve lift (CVVL) that can change valve lift according to engine speed, have been undertaken.

Also, to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

Therefore, a continuous variable valve duration (CVVD) apparatus that can adjust a duration of a valve according to an operation state of the engine has been researched.

A method of improving driving performance and fuel consumption of an engine system including the CVVD apparatus is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of and an apparatus for controlling an engine system having advantages of improving acceleration performance and fuel consumption in a section where a speed of an engine is low.

A method of controlling an engine system including a continuous variable valve duration (CVVD) apparatus according to an exemplary embodiment of the present invention may include: detecting data for controlling the engine system; determining whether a speed of an engine is less than a predetermined speed; determining whether a position value of an accelerator pedal is greater than a predetermined position value when the rotation speed of the engine is less than the predetermined speed; operating the CVVD apparatus to increase a valve overlap when the position value of the accelerator pedal is greater than the predetermined position value; and performing a knock control after the valve overlap is increased.

The performing of the knock control may include advancing an ignition timing.

The method may further include determining whether knocking of the engine occurs while the ignition timing is advanced; and retarding the ignition timing when the knocking occurs.

The method may further include performing an air-fuel ratio control after the valve overlap is increased.

The performing of the air-fuel ratio control may include controlling the air-fuel ratio to be lean.

The operating of the CVVD apparatus to increase the valve overlap may include increasing a duration of an intake valve.

The operating of the CVVD apparatus to increase the valve overlap may include increasing a duration of an exhaust valve.

An apparatus for controlling an engine system including a continuous variable valve duration (CVVD) apparatus according to an exemplary embodiment of the present invention may include: a knock detector configured for detecting a vibration of a cylinder of an engine; a crankshaft position detector configured for detecting a rotation angle of a crankshaft; an accelerator pedal position detector configured for detecting a position value of an accelerator pedal; an oxygen detector configured for detecting an oxygen amount contained in exhaust gas expelled from the engine; a controller configured for controlling operations of an injector, a spark plug, a throttle valve, an exhaust gas recirculation (EGR) valve, a wastegate valve, and the CVVD apparatus according to signals of the knock detector, the crankshaft position detector, the accelerator pedal position detector, and the oxygen detector, the controller operates the CVVD apparatus to increase a valve overlap when a rotation speed of the engine is less than a predetermined speed and the position value of the accelerator pedal is greater than a predetermined position value, and performs a knock control after the valve overlap is increased.

The controller may advance an ignition timing when performing the knock control.

The controller may retard the ignition timing when knocking occurs while the ignition timing is advanced.

The controller may perform an air-fuel ratio control after the valve overlap is increased.

The controller may be configured to control an air-fuel ratio to be lean when performing the air-fuel ratio control.

The controller may operate the CVVD apparatus to increase a duration of an intake valve when the rotation speed of the engine is less than the predetermined speed and the position value of the accelerator pedal is greater than a predetermined position value.

The controller may operate the CVVD apparatus to increase a duration of an exhaust valve when the rotation speed of the engine is less than the predetermined speed and the position value of the accelerator pedal is greater than a predetermined position value.

According to an exemplary embodiment of the present invention, a valve overlap is increased in a section where a speed of an engine is low, and thus torque responsiveness according to an increment of a rotation speed of a turbine is improved. Furthermore, when the valve overlap increased, an ignition timing is advanced and an air-fuel ratio is controlled to be lean, improving acceleration performance and fuel consumption.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
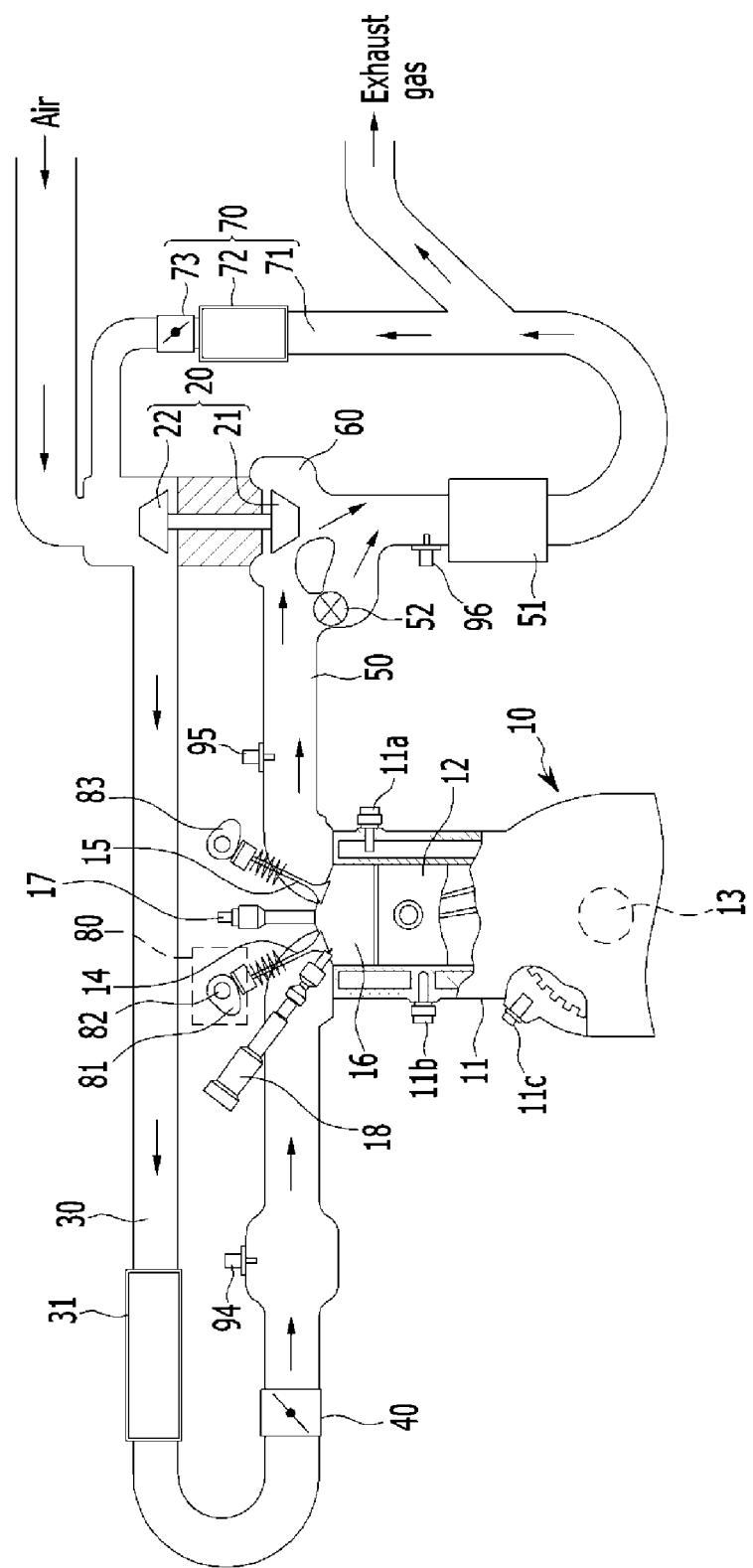
FIG. 1 is a schematic diagram of an engine system according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described more fully with reference to the accompanying drawings, in which exemplary embodiments of the invention are shown. However, the present invention is not limited to the exemplary embodiments described herein, and may be modified in various different ways.

The drawings and description are to be regarded as illustrative in nature and not restrictive. Like reference numerals designate like elements throughout the specification. The configurations illustrated in the drawings are arbitrarily shown for better understanding and ease of description, but the present invention is not limited thereto.

Figure 2:
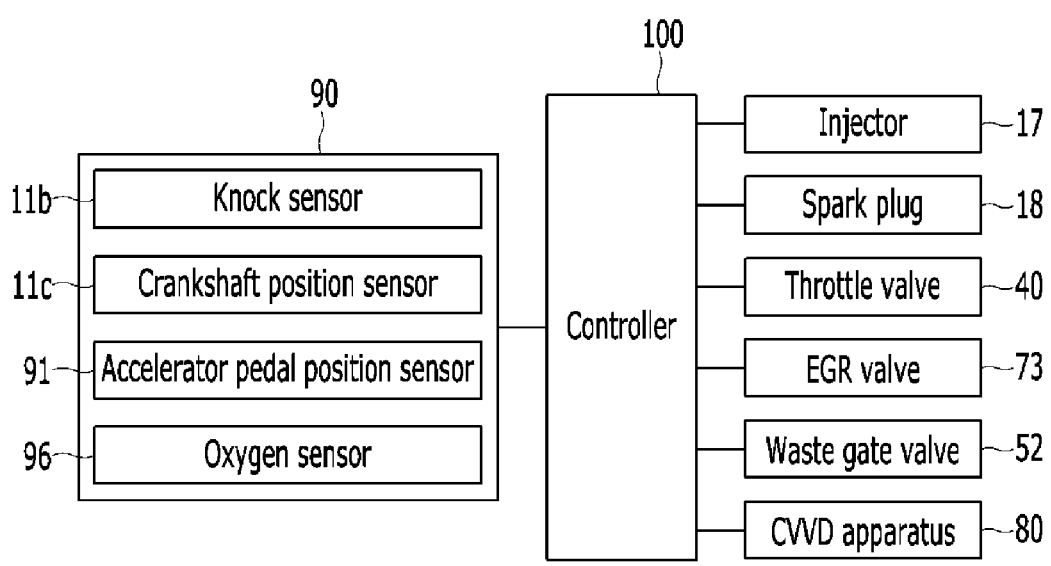
FIG. 2 is a block diagram of an apparatus for controlling an engine system according to an exemplary embodiment of the present invention.

FIG. 1 is a schematic diagram of an engine system according to an exemplary embodiment of the present invention, and FIG. 2 is a block diagram of an apparatus for controlling an engine system according to an exemplary embodiment of the present invention.

Referring to FIG. 1 and FIG. 2, an engine system according to an exemplary embodiment of the present invention may include an engine 10, a turbocharger 20, an intake line 30, a throttle valve 40, a first exhaust line 50, a second exhaust line 60, a low pressure exhaust gas recirculation (LP-EGR) apparatus 70, and a continuous variable valve duration (CVVD) apparatus 80.

The engine 10 combusts fuel and air to convert chemical energy into mechanical energy. The engine 10 includes a cylinder 11, a piston 12, a crankshaft 13, an intake valve 14, and an exhaust valve 15.

The 12 and the crankshaft 13 are mounted in the cylinder 11. The piston 12 reciprocates by explosive force of the fuel and rotates the crankshaft 13. A combustion chamber 16 is formed between the cylinder 11 and the piston 12.

The engine 10 is connected to the intake line 30 to receive air, and exhaust gas generated in a combustion process is expelled to the outside of the engine 10 through the first exhaust line 50. The intake line 30 is opened or closed by the intake valve 14, and the first exhaust line 50 is opened or closed by the exhaust valve 15. The intake valve 14 may be operated by an intake cam 81 of the CVVD apparatus 80, and the exhaust valve 15 may be operated by an exhaust cam 83.

An injector 17 injects fuel into the combustion chamber 16, and a spark plug 18 ignited mixed gas in which the fuel and the air are mixed.

A coolant temperature detector 11a, a knock detector 11b, and a crankshaft position detector 11c are mounted to the cylinder 11. The coolant temperature detector 11a detects a temperature of coolant and transmits a signal corresponding thereto to a controller 100. The knock detector 11b detects a vibration and transmits a signal corresponding thereto to the controller 100, and the controller 100 determines whether knocking occurs based on the signal of the knock detector 11b. The crankshaft position detector 11c detects a rotation angle of the crankshaft 13 and transmits a signal corresponding thereto to the controller 100, and the controller 100 determines an engine speed based on the signal of the crankshaft position detector 11c.

The turbocharger 20 includes a turbine 21 and a compressor 22. The turbine 21 may rotate by the exhaust gas, and the compressor 22 may rotate by power occurring by a rotation of the turbine 21.

The intake line 30 supplies air to the engine 10. While the compressor 22 rotates, air entered from the outside thereof is compressed to be supplied to the engine 10. Therefore, the compressed air is supplied to enhance an output of the engine 10. To cool air that passes through the compressor 22, an intercooler 31 may be mounted on the intake line 30.

The throttle valve 40 is mounted on the intake line 30, and air flow supplied from the intake line 30 to the engine is controlled according to an opening amount of the throttle valve 40.

An intake pressure detector 94 is mounted on the intake line 30 between the throttle valve 40 and the engine 10 and detects an intake pressure to transmit a signal corresponding thereto to the controller 100.

The first exhaust line 50 exhausts the exhausted gas exhausted from the engine 10 to the outside of a vehicle. A catalyst 51 may be mounted on the first exhaust line 50 to reduce harmful component of the exhaust gas.

The second exhaust line 60 is formed such that a portion of the exhaust gas joins to the first exhaust line 50 via the turbine 21. An amount of the exhaust gas that passes through the turbine 21 is controlled according to an opening amount of a wastegate valve 52 mounted on the first exhaust line 50.

An exhaust pressure detector 95 is mounted on the first exhaust line 50 and detects an exhaust pressure to transmit a signal corresponding thereto to the controller 100.

An oxygen detector 96 is mounted on the first exhaust line 50, detects an oxygen amount contained in the exhaust gas expelled from the engine 10, and transmits a signal corresponding thereto to the controller 100. The measured value of the oxygen detector 96 may be represented as lambda. The lambda means a ratio of actual air-fuel to a stoichiometric air-fuel ratio. When the lambda is greater than 1, the air-fuel ratio is lean. On the other hand, the air-fuel ratio is rich when the lambda is less than 1.

The low pressure EGR apparatus 70 may include an EGR line 71, an EGR cooler 72, and an EGR valve 73.

The EGR line 71 may connect downstream of the catalyst 51 and the intake line 30. A portion of the exhaust gas exhausted from the catalyst 51 may be resupplied to the engine 10 via the EGR line 71.

The EGR cooler 72 is mounted on the EGR line 71 to cool the exhaust gas supplied to the intake line 30.

The EGR valve 73 is mounted on the EGR line 71. When the EGR valve 73 is opened, a portion of the exhaust gas exhausted from the catalyst 51 may resupplied to the engine 10 via the EGR line 71. When the EGR valve 73 is closed, the exhaust gas exhausted from the catalyst 51 is not resupplied to the engine 10 via the EGR line 71. An exhaust gas supplied to the intake line 30 via the EGR line 71 according to an opening amount of the EGR valve 73 is referred to as an external EGR gas.

The CVVD apparatus 80 adjusts a duration of the intake valve 14. The CVVD apparatus 80 includes the intake cam 81 and the camshaft 82. The CVVD apparatus 80 may change a relative rotation speed of the intake cam 81 with respect to the camshaft 82. In other words, the duration of the intake valve 14 increases or decreases according to operation of the CVVD apparatus 80. Since the CVVD apparatus 80 is described in Korean Patent Application No. 10-2015-0178650, detailed description thereof will be omitted. Furthermore, it is to be understood that entire contents included in Korean Patent Application No. 10-2015-0178650 are a reference and are entirely included in the present embodiment. The CVVD apparatus 80 described in Korean Patent Application No. 10-2015-0178650 is an example of a continuous variable valve duration (CVVD) apparatus to which the spirit or scope of the present invention may be applied, and the spirit or scope of the present invention may be applied to various CVVD apparatuses as well as the CVVD apparatus 80 described in Korean Patent Application No. 10-2015-0178650.

Valve overlap, which is a section in which the intake valve 14 and the exhaust valve 15 are simultaneously opened, occurs according to operation of the CVVD apparatus 80. A scavenging effect may be increased by increasing the valve overlap. When the valve overlap is increased, a flow of the exhaust gas and a rotation speed of the turbine 21 are increased, improving torque responsiveness. Accordingly, when the valve overlap is very large, fuel consumption may be improved by controlling the air-fuel ratio to be lean. Furthermore, when the valve overlap is increased, residual gas in the combustion chamber 16 is decreased, lowering a temperature of the combustion chamber 16. In an exemplary embodiment of the present invention, it is illustrated that the CVVD apparatus 80 adjusts the duration of the intake valve 14, but the scope or spirit of the present invention may be applied to a case in which the CVVD apparatus 80 adjusts a duration of the exhaust valve 15.

An apparatus for controlling an engine system according to an exemplary embodiment of the present invention may include a data detector 90, the controller 100, the injector 17, the spark plug 18, the throttle valve, the EGR valve 73, the wastegate valve 52, and the CVVD apparatus 80.

The data detector 90 detects data for controlling the engine system, and the data detected by the data detector 90 is transmitted to the controller 100. The data detector 90 may include the knock detector 11b, the crankshaft position detector 11c, an accelerator pedal position detector 91, and the oxygen detector 96.

The knock detector 11b detects a vibration of the cylinder 11 of the engine 10, and transmits a signal corresponding thereto to the controller 100. The controller 100 may determine whether knocking occurs based on the signal of the knock detector 11b.

The crankshaft position detector 11c detects a rotation angle of the crankshaft 13, and transmits a signal corresponding thereto to the controller 100. The controller 100 may determine a rotation speed of the engine 10 based on the signal of the crankshaft position detector 11c.

The accelerator pedal position detector 91 detects a position value of an accelerator pedal (i.e., a pushed degree of the accelerator pedal), and transmits a signal corresponding thereto to the controller 100. When the accelerator pedal is pushed completely, the position value of the accelerator pedal is 100%, and when the accelerator pedal is not pushed, the position value of the accelerator pedal is 0%.

The oxygen detector 96 detects an oxygen amount contained in the exhaust gas expelled from the engine 10, and transmits a signal corresponding thereto to the controller 100. The measured value of the oxygen detector 96 may be represented as lambda. The lambda means a ratio of actual air-fuel to a stoichiometric air-fuel ratio. When the lambda is greater than 1, the air-fuel ratio is lean. On the other hand, the air-fuel ratio is rich when the lambda is less than 1.

The controller 100 may control operations of the injector 17, the spark plug 18, the throttle valve 40, the EGR valve 73, the wastegate valve 52, and the CVVD apparatus 80 based on the data detected by the data detector 90. The controller 100 may perform a knock control and an air-fuel ratio control based on the data. The knock control may be performed by adjusting an ignition timing of the spark plug 18, and the air-fuel ratio control may be performed by adjusting a fuel amount injected from the injector 17. The controller 100 may be implemented with at least one processor executed by a predetermined program, and the predetermined program may include a series of commands for performing each step included in a method of controlling an engine system according to an exemplary embodiment of the present invention.

Hereinafter, a method of controlling an engine system according to an exemplary embodiment of the present invention will be described more specifically with reference to FIG. 3 and FIG. 4.

Figure 3:
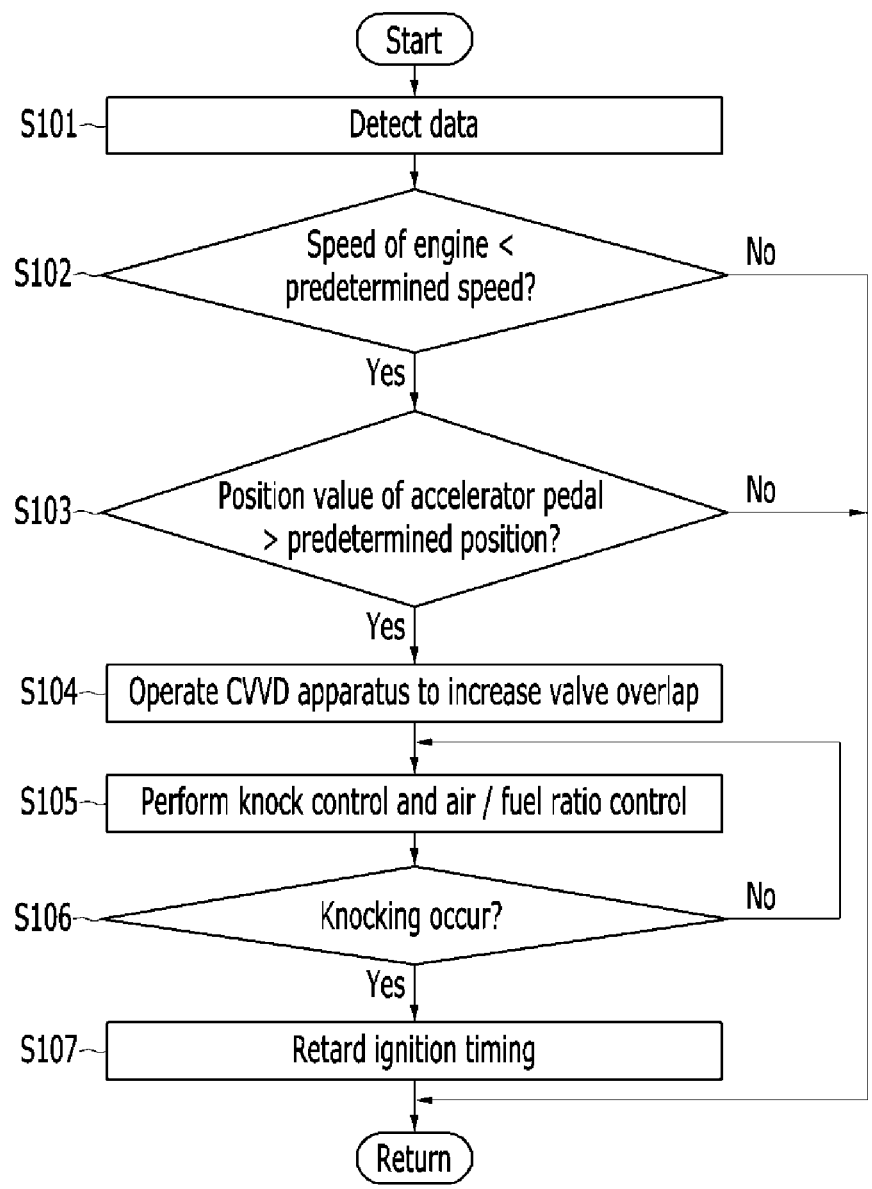
FIG. 3 is a flowchart illustrating a method of controlling an engine system according to an exemplary embodiment of the present invention.
Figure 4:
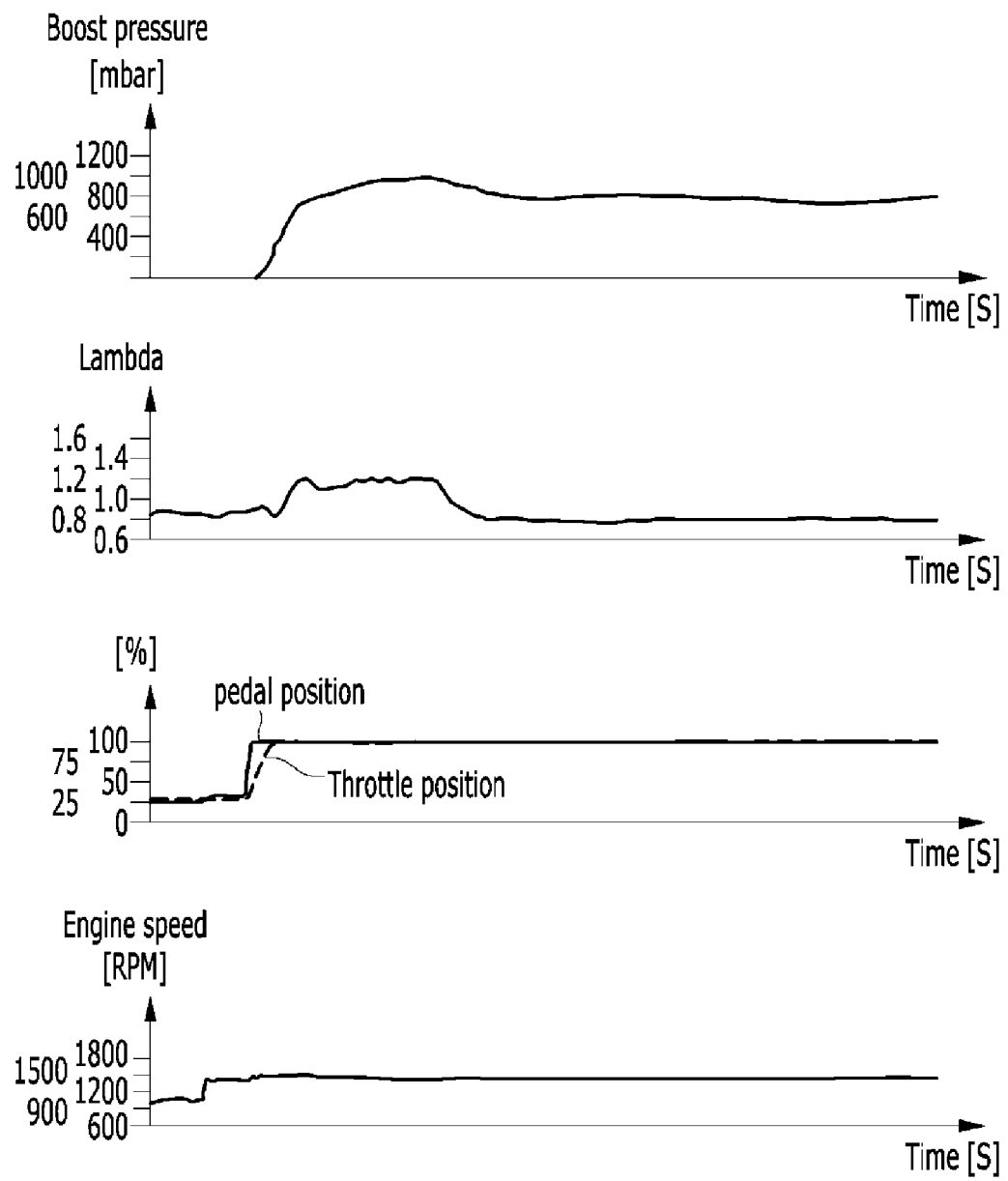
FIG. 4 is a graph for explaining a method of controlling an engine system according to an exemplary embodiment of the present invention.

FIG. 3 is a flowchart illustrating a method of controlling an engine system according to an exemplary embodiment of the present invention, and FIG. 4 is a graph for explaining a method of controlling an engine system according to an exemplary embodiment of the present invention.

Referring to FIG. 3 and FIG. 4, the controller 100 detects data for controlling the engine system at step S101. In other words, the knock detector 11b detects the vibration of the cylinder 11 of the engine 10, the crankshaft position detector 11c detects the rotation angle of the crankshaft 13, the position value of the accelerator pedal position detector 91, and the oxygen detector 96 detects the oxygen amount of the exhaust gas expelled from the engine 10. The controller 100 determines the rotation speed of the engine 10 based on the signals of the crankshaft position detector 11c.

The controller 100 determines whether the rotation speed of the engine 10 is less than a predetermined speed at step S102. The predetermined speed may be set by a person of ordinary skill in the art to determine whether the engine 10 is operated in a low speed section. For example, the predetermined speed may be 1700 RPM.

When the rotation speed of the engine 10 is equal to or greater than the predetermined speed at step S102, the controller 100 finishes the method of controlling the engine system according to an exemplary embodiment of the present invention.

When the rotation speed of the engine 10 is less than the predetermined speed at step S102, the controller 100 determines whether the position value of the accelerator pedal is greater than a predetermined position value at step S103. The predetermined position value may be set by a person of ordinary skill in the art to determine whether a driver has acceleration intention.

When the position value of the accelerator pedal is equal to or less than the predetermined position value at step S103, the controller 100 finishes the method of controlling the engine system according to an exemplary embodiment of the present invention.

When the position value of the accelerator pedal is greater than the predetermined position value at step S103, the controller 100 operates the CVVD apparatus 80 to increase a duration of the intake valve 14 at step S104. As the duration of the intake valve 14 is increased, the valve overlap, which is a section in which the intake valve 14 and the exhaust valve 15 are simultaneously opened, is increased. Accordingly, the flow of the exhaust gas and the rotation speed of the turbine 21 are increased, improving torque responsiveness. An increment amount of the duration of the intake valve 14 may be set by a person of ordinary skill in the art through an experiment. Meanwhile, the controller 100 may determine an opening amount of the throttle valve 40, an opening amount of the EGR valve 73, and an opening amount of the wastegate valve 52 based on the rotation speed of the engine 10 and the position value of the accelerator pedal. In other words, the controller 100 may increase boost pressure by controlling opening amounts of the throttle valve 40, the EGR valve 73, and the wastegate valve 52.

After the duration of the intake valve 14 is increased, the controller 100 may perform the knock control at step S105. More specifically, the controller 100 advances the ignition timing. A base ignition timing is set to a point advanced by a predetermined angle with respect to a rotation angle of the crankshaft 13 when the piston 12 is positioned at a top dead center (TDC). Torque of the engine 10 can be increased by advancing the ignition timing. The controller 100 may advance the ignition timing to Minimum spark advance for Best Torque (MBT) where maximum torque of the engine 10 is generated. The MBT may be set to a point more retarded than an ignition point where knocking of the engine 10 occurs through an experiment.

While the ignition timing is advanced, the controller 100 determines whether knocking of the engine 10 occurs at step S106. More specifically, the controller 100 may determine that the knocking of the engine 10 occurs when a vibration amount occurring in the combustion process is equal to or greater than a predetermined vibration amount based on the signal of the knock detector 11b. When the ignition timing is advanced to the MBT, the knocking of the engine 10 may occur.

When the knocking of the engine 10 does not occur at step S106, the controller 100 may continuously advance the ignition timing.

When the knocking of the engine 10 occurs at step S106, the controller 100 may retard the ignition timing to prevent occurrence of the knocking at step S107.

Meanwhile, the controller 100 may perform the air-fuel ratio control at step S105. More specifically, the controller 100 may control the air-fuel ratio to be lean. In other words, combustion environment may be controlled to be lean by decreasing a fuel amount injected from the injector 17. Accordingly, fuel consumption may be improved and a temperature of the combustion chamber 16 is lowered as compared to a case that the stoichiometric air-fuel ratio is used. The controller 100 may perform the air-fuel ratio control such that the lambda becomes 1.2 to 1.4.

Meanwhile, in an exemplary embodiment of the present invention, it is illustrated that the CVVD apparatus 80 adjusts the duration of the intake valve 14, but the scope or spirit of the present invention may be applied to a case in which the CVVD apparatus 80 adjusts a duration of the exhaust valve 15.

As described above, according to an exemplary embodiment of the present invention, the valve overlap is increased in a section where the rotation speed of the engine 10 is low, and thus torque responsiveness according to the increment of the rotation speed of the turbine 21 is improved. Furthermore, when the valve overlap increased, the ignition timing is advanced and the air-fuel ratio is controlled to be lean, improving acceleration performance and fuel consumption.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an engine system including a continuous variable valve duration (CVVD) apparatus, the method comprising:
   detecting data for controlling the engine system;
   determining whether a rotation speed of an engine is less than a predetermined rotation speed;
   determining whether a position value of an accelerator pedal is greater than a predetermined position value when the rotation speed of the engine is less than the predetermined rotation speed;
   operating the CVVD apparatus to increase a valve overlap when the position value of the accelerator pedal is greater than the predetermined position value; and
   performing a knock control after the valve overlap is increased.

2. The method of claim 1, wherein the performing of the knock control includes advancing an ignition timing.

3. The method of claim 2, further including:
   determining whether knocking of the engine occurs while the ignition timing is advanced; and
   retarding the ignition timing when the knocking occurs.

4. The method of claim 1, further including performing an air-fuel ratio control after the valve overlap is increased.

5. The method of claim 4, wherein the performing of the air-fuel ratio control includes controlling an air-fuel ratio to be lean.

6. The method of claim 1, wherein the operating of the CVVD apparatus to increase the valve overlap includes increasing a duration of an intake valve.

7. The method of claim 1, wherein the operating of the CVVD apparatus to increase the valve overlap includes increasing a duration of an exhaust valve.

8. An apparatus for controlling an engine system including a continuous variable valve duration (CVVD) apparatus, the apparatus comprising:
   a knock detector configured for detecting a vibration of a cylinder of an engine;
   a crankshaft position detector configured for detecting a rotation angle of a crankshaft;
   an accelerator pedal position detector configured for detecting a position value of an accelerator pedal;
   an oxygen detector configured for detecting an oxygen amount contained in exhaust gas expelled from the engine;
   a controller configured for controlling operations of an injector, a spark plug, a throttle valve, an exhaust gas recirculation (EGR) valve, a wastegate valve, and the CVVD apparatus according to signals of the knock detector, the crankshaft position detector, the accelerator pedal position detector, and the oxygen detector,
   wherein the controller is configured to operate the CVVD apparatus to increase a valve overlap when a rotation speed of the engine is less than a predetermined rotation speed and the position value of the accelerator pedal is greater than a predetermined position value, and is configured to perform a knock control after the valve overlap is increased.

9. The apparatus of claim 8, wherein the controller is configured to advance an ignition timing when performing the knock control.

10. The apparatus of claim 9, wherein the controller is configured to retard the ignition timing when knocking occurs while the ignition timing is advanced.

11. The method of claim 8, wherein the controller is configured to perform an air-fuel ratio control after the valve overlap is increased.

12. The apparatus of claim 11, wherein the controller is configured to control an air-fuel ratio to be lean when performing the air-fuel ratio control.

13. The apparatus of claim 8, wherein the controller is configured to operate the CVVD apparatus to increase a duration of an intake valve when the rotation speed of the engine is less than the predetermined rotation speed and the position value of the accelerator pedal is greater than a predetermined position value.

14. The method of claim 8, wherein the controller is configured to operate the CVVD apparatus to increase a duration of an exhaust valve when the rotation speed of the engine is less than the predetermined speed and the position value of the accelerator pedal is greater than a predetermined position value.

* * * * *